United States Patent [19]

Hughes

[11] 4,046,273
[45] Sept. 6, 1977

[54] CANOE LOADING APPARATUS

[76] Inventor: Douglas W. Hughes, R.R. 2, Kenyon, Minn. 55946

[21] Appl. No.: 632,285

[22] Filed: Nov. 17, 1975

[51] Int. Cl.² .............................................. B60R 9/00
[52] U.S. Cl. .............................. 214/450; 224/42.03 B; 224/42.1 H; 224/45 M
[58] Field of Search ................. 214/450; 224/42.03 B, 224/42.03 R, 29 R, 42.1 H, 42.43, 42.44, 42.45, 45 M, 45 T

[56] References Cited

U.S. PATENT DOCUMENTS

| 2,428,941 | 10/1947 | Packard | 224/45 |
| 2,785,816 | 3/1957 | Fisher | 214/450 |
| 3,693,817 | 9/1972 | Van de Water | 214/450 |
| 3,876,123 | 4/1975 | Stuntz | 224/42.03 B |

FOREIGN PATENT DOCUMENTS

| 93,243 | 11/1938 | Sweden | 224/42.03 B |
| 120,960 | 6/1927 | Switzerland | 224/45 T |

OTHER PUBLICATIONS

Lug-A-Bike, All American Products, Inc. (Advertisement) received 8/15/1972.

Primary Examiner—Robert J. Spar
Assistant Examiner—Ross Weaver
Attorney, Agent, or Firm—Burd, Braddock & Bartz

[57] ABSTRACT

An apparatus to provide assistance in the loading and supporting of canoe or similar structure on the top of a vehicle such as an automobile for transport thereof. The loading apparatus has a frame attachable to the rear of the vehicle. A forked carrier member is assembled to the frame for rotatable movement about a vertical axis and for vertical movement between a lower, loading position and an elevated transport position. A handle is provided to facilitate lifting of a canoe end portion to the carrier member. A purpose of the apparatus is to allow loading and unloading of a canoe by a single person. Means are provided on the frame for carrying one or more bicycles as well.

1 Claim, 5 Drawing Figures

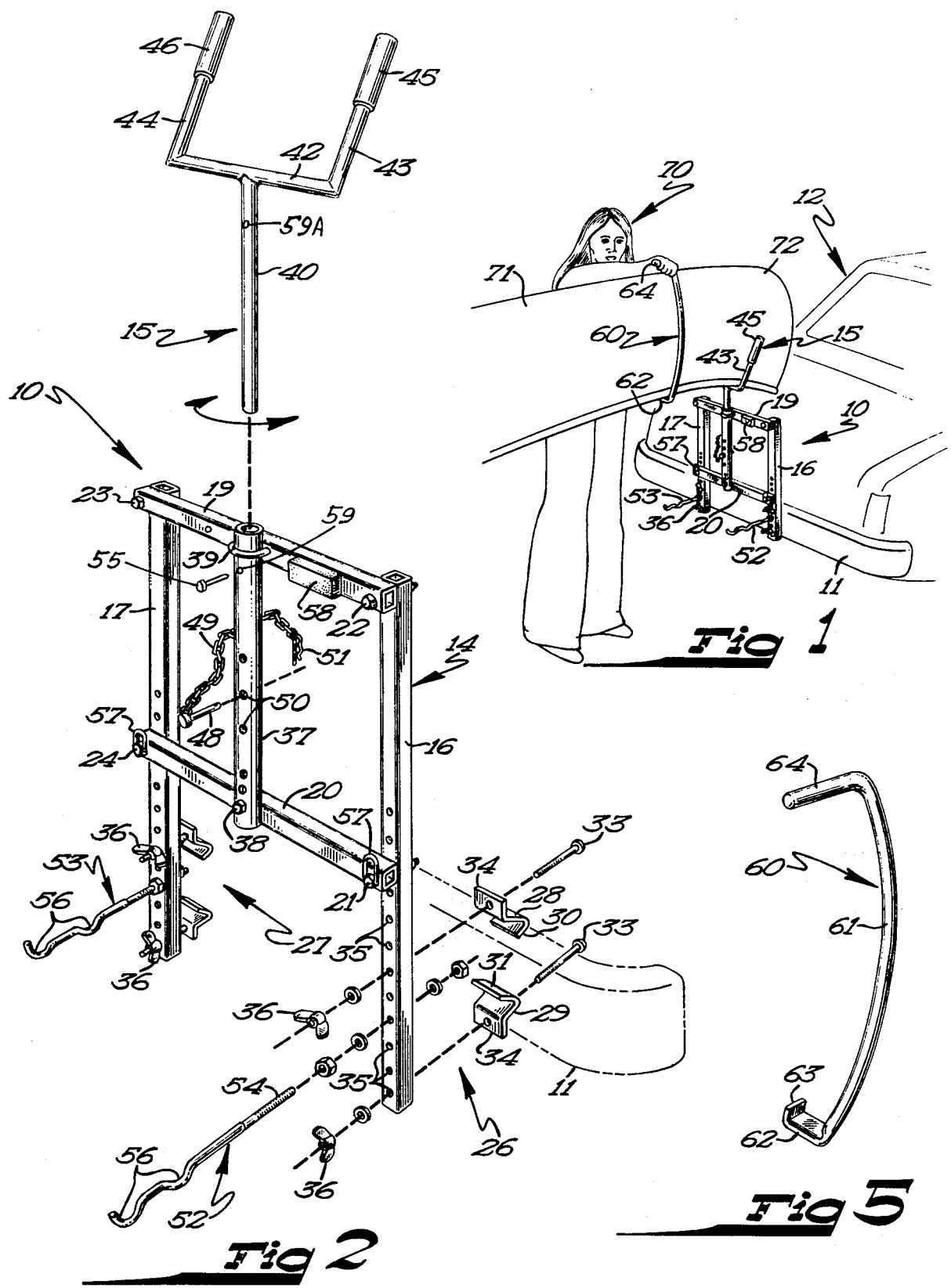

CANOE LOADING APPARATUS

BACKGROUND OF THE INVENTION

Canoes have long been popular watercraft due, among other factors, to their light weight, portability, and ease of handling. A canoe typically has capacity for several individuals or a substantial amount of gear and equipment, yet is glides easily and efficiently through the water. As a sport, canoeing has gained in popularity, and enthusiasts commonly transport their canoes from their homes to a distant location, as a lake or a river, to enjoy the sport. Probably the most common method of transport of the canoe is to carry it mounted on the rooftop of a vehicle, typically an automobile. Various prior art devices are devised to provide assistance in loading and transporting a conventional boat on the roof of an automobile, for example, see U.S. Pat. No. 2,785,816 issued Mar. 19, 1957, to Fisher. Even though a canoe is relatively light, difficulty may be encountered in loading it on top of the car, yet those devices of the prior art are not specifically tailored to this type of watercraft.

Bicycling is also a popular pastime and sport, and enthusiasts are apt to want to indulge in both canoeing and bicycling during the same outing. Yet, boat loaders and carriers of the prior art typically do not provide for carrying one or more bicycles on the automobile at the same time that a boat is being transported.

SUMMARY OF THE INVENTION

The invention relates to a loading apparatus mountable on a vehicle, and particularly an automobile, to assist in loading a canoe or like structure on the roof of the vehicle and secure it for transport with the vehicle. A frame is mountable on the vehicle, preferably at the rear thereof and on a rear bumper. A carrier member is movably assembled to the frame, engageable with an end portion of a canoe. The carrier member is rotatable about a generally vertical axis to permit movement of the canoe to and from a position mounted over the roof of the vehicle. The carrier member is also vertically movable relative to the frame from a lower position for loading of the canoe, and an elevated position for carrying part of the canoe during transport. A shaft of the carrier member is telescopically engageable with part of the frame and a forked portion is engageable with the end of the canoe. The forked portion includes a pair of parallel, spaced apart arms angularly orientated or pitched relative to the shaft and spaced apart a sufficient distance to straddle and engage the sides of a canoe on a divergent section thereof.

In one form of the invention a handle is provided for engagement of the canoe to assist in raising an end of the canoe and inserting it in the carrier when the carrier is in the relatively lower position. Also in one form of the invention there is provided a pair of bicycle tongs upon which one or more bicycles can be mounted for transport of the bicycles with or without a canoe loaded on the apparatus.

IN THE DRAWINGS

FIG. 1 is a perspective view of a canoe loader of the present invention on a partially shown vehicle and having a canoe in the process of being loaded thereon;

FIG. 2 is an exploded view of the canoe loader of FIG. 1;

FIG. 5 is a perspective view of the canoe loading handle according to one form of the present invention.

DESCRIPTION OF THE PREFERRED EMBODIMENT

Figure 3:
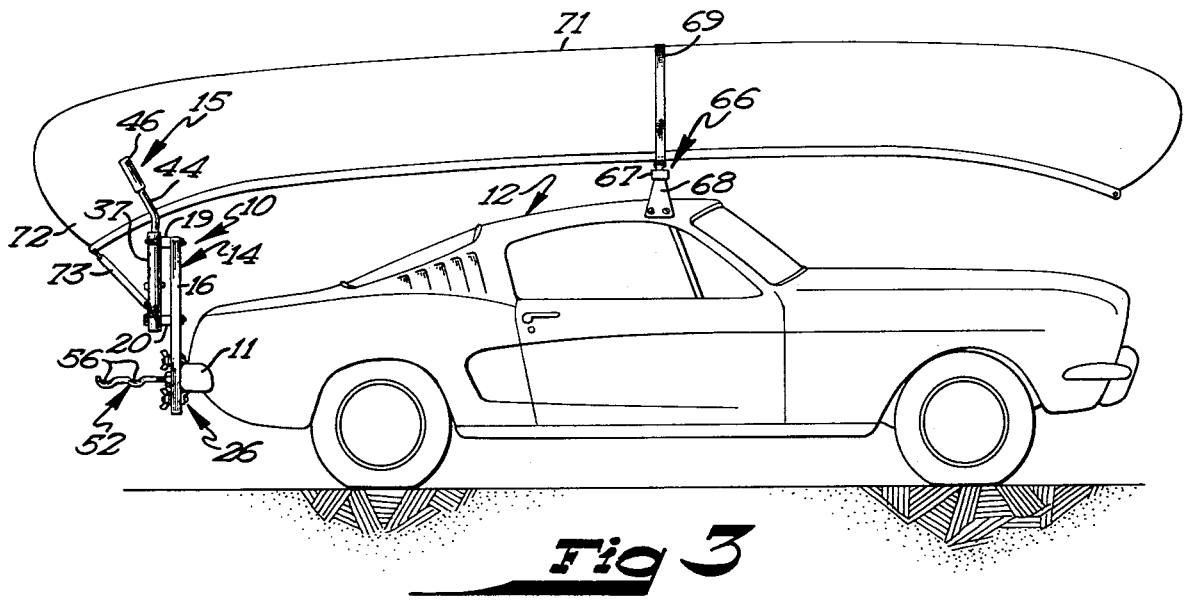
FIG. 3 is a side elevational view of the canoe loader of FIG. 1 installed on an automobile and having a canoe loaded thereon ready for transport.

Referring to the drawings, there is shown in FIGS. 1 and 2 a canoe loader according to the present invention indicated generally at 10, mounted on the rear bumper 11 of a conventional automobile 12. Canoe loader 10 is mountable on many different types of vehicles and includes a generally square frame 14 with a forked carrier member 15 movably assembled thereto. Frame 14 includes a pair of parallel, upright side bars 16, 17 connected at their upper ends by an upper cross bar 19 and intermediately by cross bar 20. Conventional nut and bolt assemblies 21-24 securely connect the respective side bars and cross bars.

Clamp assemblies 26, 27 clamp the lower ends of side bars 16, 17 respectively to the bumper 11 to secure frame 14 to automobile 12. Clamp assemblies 26, 27 are identical, the clamp assembly 26 including symmetrical, upper and lower clips 28, 29 having reverse turned lips 30, 31 adapted to engage upper and lower edges respectively of bumper 11. Bolts 33 pass through vertical flange portions 34 on clips 28, 29, thence through holes 35 on side bar 16. Side bar 16 is provided with a plurality of vertically aligned holes 35 whereby clamp assembly 26 will accommodate bumpers of varying sizes. Wing nuts 36 are releasably threaded on the ends of bolts 33 to complete the clamp assembly. Other forms of clamp assemblies can be used.

An upright, hollow tubular member or standard 37 is mounted to frame 14 for receipt of carrier member 15. Standard 37 is vertically mounted midway between side bars 16, 17 on cross bars 19, 20. A bolt assembly 38 securely fastens the lower portion of standard 37 to intermediate cross bar 20, and a suitable U-bolt 39 fastens the top end of standard 37 to upper cross bar 19. The bolt assembly 38 is engageable with any one of a plurality of vertically aligned holes in the bottom of the standard 37 for adjustment thereof for use on different vehicles.

Forked carrier member 15 has a vertical shaft 40 for telescopic engagement with standard 37. At the top of shaft 49 is a fork formed of horizontal, supporting cross piece 42 and parallel, spaced apart arms 43, 44 extending from the outer ends of cross piece 42. Arms 43, 44 extend generally upward but at an inclination relative to shaft 49. The ends of arms 43, 44 can have resilient, protective covers 45, 46. Arms 43, 44 are approximately the same length as cross piece 42. A canoe is characterized by curved side walls which converge from the midportion of the boat to a relatively pointed end. Arms 43, 44 are spaced apart sufficiently to receive a canoe at a section of the converging side walls with the canoe gunnel resting on cross piece 42. Arms 43, 44 are inclined or pitched with respect to the vertical for interception with the converging canoe side walls along a section of relatively flat profile.

A locking pin 48 conveniently fastened to standard 37 by a chain 49 is selectively engageable in one of a plurality of suitable holes 50 passing diammetrically through standard 37. When in engagement with one of the holes 50, locking pin 48 provides a stop for the lower end of shaft 40 of carrier member 15, thus holding it in a relatively elevated position for transport of a loaded canoe. Disengagement of locking pin 48 permits lowering of the carrier member 15 to a relatively lower position for loading and unloading a canoe. A clip 51 is engageable with the end of locking pin 48 to hold it in place.

A second locking pin 55 is engageable with aligned holes 59 in standard 37 and 59A in shaft 40 when carrier member 15 is in the lower position. Second locking pin 55 prevents rotation of carrier member 15 when a canoe is being loaded thereon, and can be stored in a suitable opening in cross bar 19 when not in use.

A pair of bicycle tongs 52, 53 are provided for transport of one or more bicycles. The bicycle tongs 52, 53 are assembled to the lower ends of side bars 16, 17 as by having threaded ends 54 passing through one of the holes 35 in the side bars and being secured thereon by suitable nuts. The bicycle tongs 52, 53 are in horizontal alignment and have pairs of aligned, U-shaped upwardly open loops 56 for accommodating the cross bar of an inverted bicycle. Links 57 are assembled to intermediate cross bar 20 at the nut and bolt assemblies 21, 24 for accommodating suitable straps holding the bicycles in place. A bumper 58 is located on top cross bar 19 for cushioning a bicycle portion.

Referring to FIGS. 1 and 5, a handle 60 is usable in assocation with canoe loader 10 in loading the canoe. Handle 60 has a curved elongate body portion 61 contoured to substantially conform to the curvature of a typical canoe. A hook 62 is located at one end of body 61 and is inwardly turned having an upwardly extended lip 63 for engagement of the gunnel of a canoe as shown in FIG. 1. A grip 64 is located at the top end of the handle 60 and extends in a direction perpendicular to that of hook 62 or in the direction parallel to the longitudinal axis of the canoe when in use as shown in FIG. 1.

Figure 4:
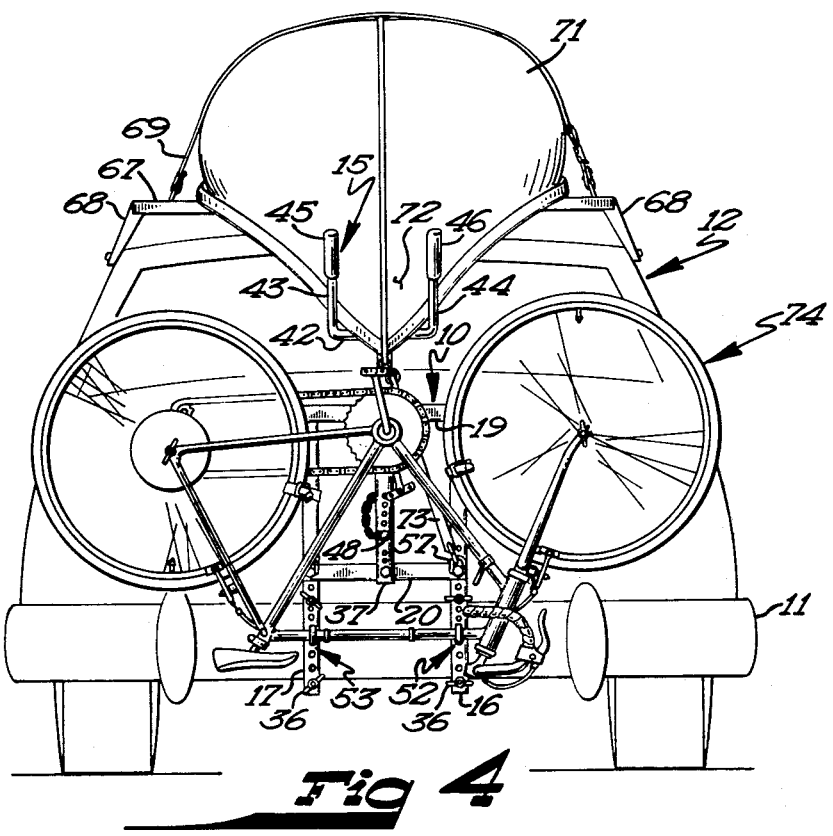
FIG. 4 is a rear plan view of the canoe loader, automobile and canoe of FIG. 3 and showing a bicycle mounted thereon also.

Shown in FIGS. 3 and 4, a roof rack 66 is used in association with canoe loader 10. Roof rack 66 is mountable on the roof of automobile 12 and has a transverse beam 67 for supporting the gunnels of a canoe. Brackets 68 at either end of beam 67 engage the rain gutters or other portions of automobile 12 to hold roof rack 66 in place. A strap 69 is provided for extension over the canoe to be fastened at either end of beam 67 to hold the canoe in place.

In use, referring to FIG. 1, carrier member 15 is in the lower position preparatory to loading a canoe 71, locking pin 48 having been removed from standard 37. To prevent carrier 15 from rotating while being approached with the canoe, second locking pin 55 is inserted through the holes 59 and 59A of standard 37 and shaft 40. The arms 43, 44 of carrier member 15 are inclined forwardly toward the front of automobile 12. A person 70 lifts the inverted end 72 of the canoe 71 and places it in engagement with the fork formed by the arms 43, 44. The canoe is placed in the fork of a carrier 15 to a longitudinal location on the canoe where the width of the canoe fills the expanse between arms 43, 44 and further longitudinal movement is prohibited by the diverging side walls of the canoe. The canoe is snugly nested in the fork of carrier member 15. The arms 43, 44 are inclined to a position such that they lie relatively flat across the surface of the side walls of the canoe. The canoe gunnel rests on cross piece 42. The operation of lifting the canoe to position relative to carrier 15 is facilitated by handle 60 to and extent where it is accomplished by one person. Person 70 stands on one side of the canoe 71 and, using handle 60, reaches over to the other side to engage the gunnel of the canoe with the hook 62. Lifting the grip 64 on one side and manually lifting the gunnel of the canoe on the other side, the person 70 is able to easily position the end of the now top heavy, inverted canoe on carrier 15. Second locking pin 55 is now removed from the holes 59 and 59A.

Carrier member 14 is elevated and locked in the elevated position by inserting locking pin 48 in the closest adjacent, lower hole 50 to support the shaft 40 in the elevated position. Having accomplished this, person 70 walks to the other end of the canoe and lifts it, which is relatively easy as much of the canoe weight is supported on canoe loader 10. Person 70 then walks around to the front of automobile 12 with the opposite end of the canoe. Carrier member 15 swivels in frame 15. The canoe is positioned on roof rack 66 as shown in FIG. 3 with the canoe gunnel supported on beam 67. Carrier member 15 of canoe loader 10 is elevated in standard 37 to a position where the longitudinal axis of canoe 71 is substantially level. Strap 69 of rooftop carrier 66 is placed over the canoe 71 to secure it. Additional straps 73, shown in FIG. 3, can be used to secure the end of the canoe to the canoe loader 10 as by extending from the end of the canoe to the links 57 assembled to intermediate cross bar 20. Canoe 71 is quickly and securely loaded on automobile 12 and ready for transport. The reverse procedure is followed in unloading the canoe.

The fork of carrier member 15 prevents rolling and shifting of the canoe while loading or during transport. The canoe loader carries much of the weight of the canoe thus to relieve this burden from the car roof or rain gutters. Once mounted, the canoe will not shift or tip in strong winds due to support provided by canoe loader 10, nor will the canoe catapulted from its position due to rapid acceleration or deceleration.

Canoe loader 10 with a canoe loaded thereon does not impair the visibility of the driver of vehicle 12. The canoe is positioned toward the rear of the vehicle and there are no tie down ropes or straps extending over the front windshield to the front of the vehicle. Elimination of such tie down ropes eliminates possible rope burn to the vehicle finish and permits full access to the front or engine compartment of the vehicle. When unloaded, canoe loader 10 does not obstruct trunk lid operation and even when loaded permits adequate access to the trunk compartment.

As shown in FIG. 4, one or two bicycles can be loaded on canoe loader 10 with or without a canoe loaded thereon. In inverted position, the cross bars of the bicycles are placed in the U-shaped loops 56 of the bicycle tongs 52, 53 as the bicycle 74 in FIG. 4. Suitable straps are employed to secure the bicycles in place. When loaded in such upside down orientation, the majority of the bicycle is located behind the lower rear body structure of automobile 12 whereby wind resistance is reduced, rear vision is not obstructed, and damage to the vehicle from the bicycle pedals is avoided. When not carrying a bicycle, tongs 52, 53 can carry other items such as a tent, tent frame, luggage, oars or the like.

Canoe loader 10 is usable also for hauling or transporting other items otherwise difficult to transport such as an elongate ladder, pieces of lumber, a rool of carpet or the like. Loading, unloading and transport of such items are facilitated by the canoe loader.

While there has been shown and described a preferred embodiment of the invention, it will be apparent to those skilled in the art that certain deviations and modifications can be made to the embodiment shown without departing from the scope and spirit of the invention.

The embodiments of the invention in which an exclusive property or privilege is claimed are defined as follows:

1. An apparatus to assist in loading and at least partially supporting a canoe for transport on an automotive type vehicle, including:

a generally upright frame having a pair of horizonal, spaced apart side bars, a top cross bar disposed between and connected to the upper ends of the side bars, and an intermediate cross bar disposed between and connected at an intermediate location on said side bars;

adustable clamp means on the frame to secure the frame to a bumper of an automotive type vehicle, said clamp means including first and second clamp assemblies, one of said clamp assemblies disposed at the lower end of each of said side bars of the frame, each said clamp assembly including upper and lower clips having reverse turn lips adapted to engage upper and lower edges of the bumper of an automotive type vehicle, bolt means assembling the clips to the side bars of the frame, each side bar being provided with a plurality of vertically aligned holes to accommodate the bolt means and permit adjustment of the location of the first and second clips of each clamp assembly;

a hollow tubular member vertically mounted on said frame being connected to said top cross bar and said intermediate cross bar at a location approximately midway between the side bars;

a carrier member for supporting an end section of a canoe, said carrier member having a normally vertical shaft with a lower end in telescopic engagement with said tubular member, said shaft end being axially rotatable in said tubular member and vertically movable therein;

said carrier member having a fork portion for engagement of a canoe end section, said fork portion including a horizontal cross piece secured to the upper end of said shaft to engage and support a canoe gunnel, and a pair of parallel spaced apart arms extending generally upward from either end of said cross piece, said arms being disposed at an inclination relative to said vertical shaft and spaced apart a sufficient distance to intercept and accommodate diverging side walls of an end section of a canoe to snugly engage said side walls with the canoe gunnel resting on said cross piece;

each of said arms and said cross piece of the carrier member being approximately the same length;

said shaft being vertically movable in said hollow tubular member to move said fork portion of the carrier member between a first, lower canoe loading position and a second, elevated canoe transport position;

releasable lock means to lock the carrier member in the elevated transport position, said lock means including a locking pin, a plurality of vertically spaced openings in the tubular member, said locking pin selectively engageable in one of said openings to support the end of said shaft with the carrier member in the elevated position, and removable from said opening to permit movement of the carrier member to the lower position;

a pair of horizontally aligned bicycle tongs for transport of at least one bicycle, one of said tongs being assembled to the lower portion of each of said side bars, said bicycle tongs having aligned, upwardly open loops for receipt of the cross bar of at least one inverted bicycle to locate the bicycle sufficiently below the forked member of the carrier to avoid interference with a canoe loaded thereon; and a canoe loading handle usable by a canoeist to load an end section of a canoe in the fork of said carrier member when the carrier member is in the lower position, said handle having a curved body portion generally contoured to substantially conform to the side walls of a canoe, a hook portion at the lower end of the body portion for engagement of the gunnel of a canoe, and a grip member at the upper end of the body portion for gripping and lifting by a canoeist to lift said canoe end section and position it in engagement with the fork portion of the carrier member.

* * * * *

UNITED STATES PATENT AND TRADEMARK OFFICE
CERTIFICATE OF CORRECTION

PATENT NO. : 4,046,273
DATED : September 6, 1977
INVENTOR(S) : Douglas W. Hughes It is certified that error appears in the above-identified patent and that said Letters Patent are hereby corrected as shown below:

Under "References Cited", the following U. S. Patent is omitted:
--2,470,848  5-1949  Guest-----224/42.1 H --.

Column 1, line 65, after "invention", --installed-- is omitted.

Column 2, line 51, "49" should be --40--.

Column 2, line 55, "49" should be --40--.

Column 4, line 10, "14" should be --15--.

Column 4, line 18, "15" (second occurrence) should be --14--.

Signed and Sealed this

Thirteenth Day of December 1977

[SEAL]

Attest:

RUTH C. MASON
Attesting Officer

LUTRELLE F. PARKER
Acting Commissioner of Patents and Trademarks